United States Patent Office

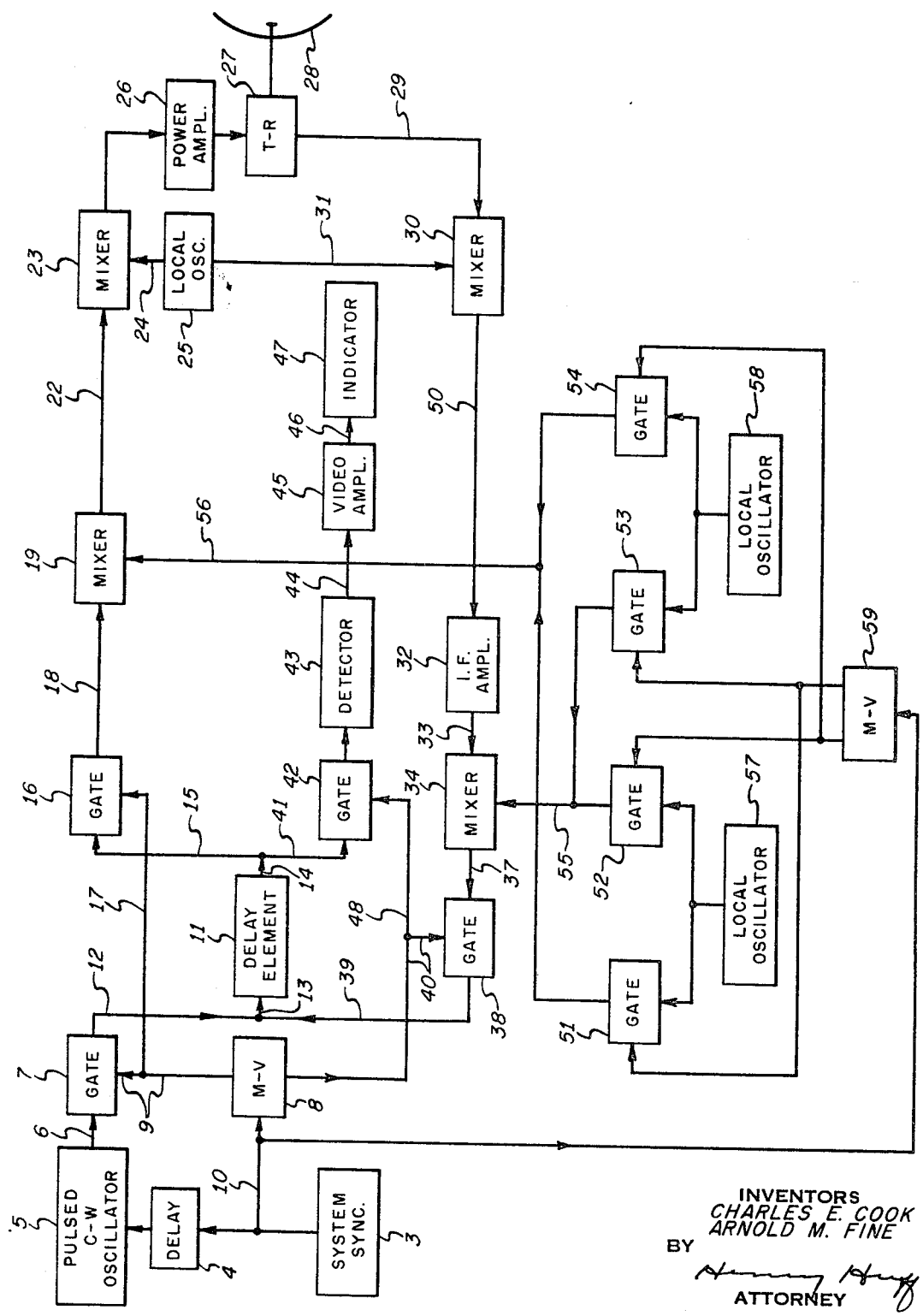

3,408,650
Patented Oct. 29, 1968

3,408,650
PULSE COMPRESSION RADAR
Charles E. Cook, Farmingdale, and Arnold M. Fine, Plainview, N.Y., assignors to Sperry Rand Corporation, Great Neck, N.Y., a corporation of Delaware
Filed June 22, 1960, Ser. No. 38,072
7 Claims. (Cl. 343—17.2)

The invention herein described was made in the course of or under a contract or subcontract thereunder, with the Department of the Air Force.

The present invention relates to a radar systems of the pulse compression type and, more particularly, to a pulse compression radar adapted to discriminate against interfering signals including signals reflected from target objects situated within selectable range intervals.

A pulse compression radar is defined and its principles of operation are explained in U.S. Patent 2,624,876, issued to Robert H. Dicke on Jan. 6, 1953. Briefly stated, a pulse compression radar includes apparatus for the transmission of a relatively low amplitude, long duration pulsed microwave signal whose component signal frequencies occur in a predetermined time sequence. For example, a typical transmitted pulse spectrum might be frequency modulated or swept from a low frequency value to a high frequency value, the time order of occurrences of the component signal frequencies varying directly with the frequency values.

The frequency swept transmitted pulse is reflected from target objects and is received at the radar without modification of the sense in which the transmitted pulse was frequency swept. The echo, like the transmitted signal, is of relatively long duration but is compressed into a relatively high amplitude brief duration pulse after passing through a "pulse compressing" filter. The compressing filter progressively delays the component signal frequencies of the echo pulse by amounts which vary inversely with the frequency values. In the illustrative case, where the transmitted pulse component frequencies are swept from a low value to a high value, the compression filter delays the earlier occurring lower frequency component signals by greater amounts than the later occurring higher frequency component signals of the echo pulse. By this action, the occurrences of the component frequency signals of the echo signal are "compressed" in time whereby a pulse of brief duration is produced at the output of the compressing filter in response to the relatively longer duration input echo pulse.

As taught in copending U.S. application Ser. No. 546,599, filed Nov. 14, 1955, in the names of Charles E. Cook and Charles E. Brockner, a single filter may be employed both to produce the frequency swept transmitted pulses of long duration and to compress the received echo pulses. Such dual functioning of the single filter is made possible by inverting the sense of the frequency swept signal either in the transmitter or in the receiver between the time that the outgoing signal is produced and the time that the echo signal returns to the filter finally to be compressed therein. It is immaterial whether the sense of the frequency sweeping is inverted within the transmitter or within the receiver so long as one and only one inversion is accomplished. The inversion of the sense of frequency sweeping is achieved by a heterodyning technique.

In accordance with the present invention, the locale of the frequency sweep inversion is changed between the transmitter and the receiver in a predetermined manner whereby the sense of the frequency sweeping of the transmitted pulses is inverted from time to time. When inversion is produced in the transmitter, the sweep sense of the desired echo signals is unaltered in the receiver. On the other hand, if no inversion is produced in the transmitter, then the sense of the frequency sweeping of the desired returning echo signals is inverted in the receiver prior to the application of said echo signals to the pulse compressing filter. The frequency sweep inversions are accomplished by signal heterodyning techniques similar to that disclosed in copending application Ser. No. 546,599.

It is the general object of the present invention to provide a radar of a pulse compression type which is substantially resistant to interfering received signals having frequency characteristics differing from those of the pulses transmitted by the radar in a given pulse repetition interval.

Another object is to provide a pulse compression radar adapted to discriminate in favor of echo signals reflected from target objects situated within selectable range intervals.

A further object is to provide a pulse compression radar having a selectable unambiguous target range.

These and other objects are achieved as described in the following specification with the aid of the sole figure which is a block diagram of a preferred embodiment of the invention.

In the figure, a source of system synchronizing triggers 3 determines the pulse repetition interval of the radar system. The generated triggers are applied via delay device 4 to pulsed oscillator 5. Oscillator 5 produces, when triggered by the delayed pulses at the output of delay 4, a pulsed carrier signal rich in harmonic content. The pulsed signal is applied by gate 7, when conducting, to delay element 11. Element 11 preferably is a filter of the band pass type which introduces varying delays in the signal components comprising the signal passed by gate 7 depending upon the frequency values of said component signals. For example, element 11 may be designed to delay higher frequency components by greater amounts than the delays introduced in the lower frequency signal components. As a result, the pulse passed by gate 7 is dispersed or lengthened whereby the duration of the pulse at the output of element 11 is longer than that of the pulse at the input thereto. It will be seen that similar pulse lengthening may be produced in the event that delay element 11 introduces greater delays in lower frequency components than in higher frequency components. In either case, the broadened pulse at the output of element 11 is progressively swept in frequency from one extreme value to another extreme value, i.e., from a lowest frequency value to a highest frequency value or vice versa. It should be noted that the frequency swept pulse alternatively may be produced by conventional frequency modulation techniques similar to the one disclosed in the aforementioned Dicke patent.

The lengthened and frequency swept pulse at the output of element 11 is applied by gate 16, when conducting, to heterodyne converter or mixer 19. The purpose of mixer 19, as will appear more fully later, is to selectively reverse the sense in which the pulsed signal at the output of gate 16 is frequency swept. Mixer 19 includes a band pass filter for selecting one of the side band signals resulting from the heterodyning action. The selected side band signal is raised to a convenient carrier frequency value by the action of mixer 23 and local oscillator 25, is amplified to a level suitable for transmission in power amplifier 26, and is applied by T-R device 27 to antenna 28.

Echo signals reflected from target objects are received by antenna 28 and applied via T-R 27 to mixer 30. Mixer 30 shares the same local oscillator 25 as does mixer 23 to produce an IF signal on line 50 for application to IF amplifier 32. It should be noted that the frequency sweep sense of the pulses at the output of mixer 19 is undisturbed in mixers 23 and 30 and upon reflection by target objects whereby the frequency sweep sense of the signals on line 33 is identical to that of the signals on line 22. The signals on line 33 are applied to a first input to heterodyne converter or mixer 34. The purpose of mixer 34, like that of mixer 19, is to selectively invert the sense of the frequency sweep of the signal appearing on line 33. If inversion was accomplished in mixer 19, no further inversion is produced in mixer 34. If no inversion was produced in mixer 19, then mixer 34 operates to invert the sense of the frequency sweeping of the pulses on output line 37 relative to that of the input pulses on line 33.

The pulses produced at the output of mixer 34 are applied by gate 38, when conducting, to the input of delay element 11 wherein the pulses are compressed in duration to be commensurate with the duration of the pulses passed by gate 7 and originally applied to element 11. The compressed pulses at the output of element 11 are applied via gate 42, when conducting, to envelope detector 43. The detected pulses are amplified in video amplifier 45 and applied to target signal indicator 47.

The conduction of gates 7, 16, 38 and 42 is controlled by monostable multivibrator 8 which is actuated at the radar pulse repetition rate by the triggers applied by line 10 at the output of synchronizer 3. Multivibrator 8 produces two output control potentials of opposite phase whereby gates 7 and 16 are simultaneously rendered conductive at the same time that gates 38 and 42 are rendered non-conductive and vice versa. Gates 7 and 16 are opened prior to the appearance of a pulse signal on line 6 by an amount determined by the fixed time delay interposed by delay 4 in the output signals of synchronizer 3. Gates 7 and 16 remain conductive for an interval sufficient to pass the pulsed signals appearing on line 6. Immediately thereafter, gates 7 and 16 are closed and gates 38 and 42 opened (rendered conductive) to allow for the passage of the target echo signals resulting from the transmission of the pulses on line 6.

The system so far described is similar to the one set forth in copending application Ser. No. 546,599. In accordance with said application, signals of fixed frequency are applied respectively to mixers 19 and 34 whereby frequency sweep inversion is accomplished in a predetermined one of said mixers. The present invention provides for selectively changing the frequencies of the local oscillator signals applied to mixers 19 and 34 to interchange the frequency sweep inversion functions of mixers 19 and 34 in a predetermined manner.

The local oscillator signals for application to mixers 19 and 34 are derived from local oscillators 57 and 58 in accordance with the conduction of gates 51, 52, 53 and 54. Said conduction, in turn, is determined by bistable multivibrator 59 which is alternately triggered into opposite states of conduction by the synchronizing triggers of line 10. The state of conduction of multivibrator 59 reverses each radar repetition interval, i.e., each time that a synchronizing trigger appears on line 10.

Multivibrator 59 produces two output control signals of opposite phase for the actuation of gates 51, 52, 53 and 54. Gates 51 and 53 are simultaneously rendered conductive by one of said two output control signals. Gates 52 and 54 are simultaneously rendered conductive by the other of said two output control signals. Thus, gates 51 and 53 are opened when gates 52 and 54 are closed and vice versa. The output signal of local oscillator 57 is jointly applied to gates 51 and 52; the output signal of local oscillator 58 is jointly applied to gates 53 and 54. The local oscillator signals passed by gates 51 and 54 are applied via line 56 to mixer 19. The signals passed by gates 52 and 53 are applied to mixer 34 by line 55. For example, when the state of conduction of multivibrator 59 in a given radar repetition interval is such that gates 52 and 54 are rendered conductive, local oscillator 57 is coupled to mixer 34 and local oscillator 58 is coupled to mixer 19. In the immediately succeeding radar repetition interval, the synchronizing trigger of line 10 inverts the state of conduction of multivibrator 59 whereby the coupling of oscillators 57 and 58 to mixers 34 and 19 is interchanged.

The manner in which mixers 19 and 34 selectively invert the sense of the frequency sweeping of the signals respectively applied thereto may be readily understood by assuming illustrative frequency values. Assume that local oscillator 57 produces a signal at 70 megacycles per second and that oscillator 58 produces a 130 megacycle per second signal. Assume further that the band pass filter included within mixer 19 passes side band signals centered about 100 megacycles per second and that the side band which is centered about 30 megacycles per second is selected at the output of mixer 34. In a typical case, the signal at the output of gate 16 is frequency swept from 25 to 35 megacycles per second. Thus, when oscillator 57 is coupled to mixer 19, the upper side band is selected whereas when oscillator 58 is coupled to mixer 19 the lower output side band signal is selected and passed to mixer 23. On the other hand, the lower side band (difference frequency) signal is always selected at the output of mixer 34 irrespective of whether oscillator 57 or 58 is coupled thereto.

It can be shown that the sense of frequency sweep of the signal applied to a heterodyne converter or mixer is inverted when the two conditions are met that the frequency of the beating oscillator signal is higher than that of the frequency swept signal and that the lower resultant side band signal is selected. Accordingly, sweep inversion is accomplished in mixers 19 and 34 only when local oscillator 58 is coupled thereto.

Local oscillator 58 is coupled alternately to mixers 19 and 34 in response to the synchronizing triggers of line 10 which actuate multivibrator 59. Inasmuch as the sense of the frequency sweeping produced by delay element 11 remains fixed for a given design, the sense of the frequency sweep of the pulses radiated by antenna 28 reverses at the radar repetition rate each time that local oscillator 58 is coupled to mixer 19. Echo signals received from target objects within the same repetition interval as the corresponding transmitted pulses are appropriately inverted, when necessary, by mixer 34 so that the echo signals exhibit proper frequency sweep sense when applied to compressing filter 11. It should be noted that echo signals resulting from pulses transmitted during the preceding radar interval (second time around echo signals) are not suitably modified in mixer 34 for compression in element 11. On the contrary, such echo signals are further dispersed and suppressed when they are applied to element 11. In this manner, the return from targets beyond the maximum unambiguous range of the radar system (as limited by the pulse repetition interval) is substantially suppressed to eliminate ambiguous range indications on indicator 47.

It may become desirable to view exclusively the echo signals resulting from targets situated beyond the normal range of the radar system, i.e., to view second time around echo signals. The obvious advantage is that the full target detection capabilities of the radar could then be exploited without the disadvantage of the range ambiguity inherent in conventional radar apparatus. The present invention is adaptable for the display of such extended range target signals to the exclusion of those target signals which are received during the same pulse repetition interval when the exploratory pulse which produced them was transmitted. This desirable result can be achieved merely by reconnecting multivibrator 59 to gates 51–54 so that gates 51 and 52 are closed at the same time that gates 53 and 54 are opened and vice versa. The result is that oscillators 57 and 58 are connected during alternate radar repetition intervals to both mixers 19 and 34. In this case, if the frequency sweep of an outgoing pulse is inverted in mixer 19, the frequency sweep of the echo signals received during the next following pulse repetition interval is not additionally inverted in mixer 34. On the other hand, if the frequency sweep of the outgoing pulse is not inverted in mixer 19, then the frequency sweep of the echo signals received during the next following pulse repetition interval is appropriately inverted in mixer 34. In either case, only the echo signals received during the repetition interval next following the corresponding transmitted pulse will be of proper frequency sweep sense for compression in delay element 11. The echo signals received during the same repetition interval as the occurrence of the corresponding transmitted pulse will be dispersed and suppressed in element 11.

A further feature of the present invention is that the effects of deliberate attempts to jam the operation of the radar may be minimized. It should be noted that such attempts will be unsuccessful unless the interfering signals are frequency swept in the same sense as those returned from the desired target objects within a given repetition interval. The countermeasures problem of maintaining proper frequency sweep sense of the interfering signals is greatly intensified where the frequency sweep sense of the signals transmitted by the victim radar are varied in a non-uniform and apparently random fashion. An apparently random changing of the sweep sense of the transmitted pulses can be effected simply by actuating multivibrator 59 at irregular intervals of time which may or may not be multiples of the basic radar repetition interval.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. A system for transmitting and receiving electromagnetic energy, said system comprising in combination means for generating a pulsed signal which is progressively swept in frequency between two frequency values, first signal mixing means, means for applying said pulsed signal to said first mixing means, signal transmitting means connected to the output of said first mixing means, signal receiving means, second signal mixing means connected to the output of said receiving means, means coupled to the output of said second mixing means for progressively delaying the different frequency components of the signal at the output of said second mixing means in accordance with the frequency values of said components, a source of first signals, a source of second signals, and means for applying said first and second signals in alternation to each of said first and second mixing means.

2. A system for transmitting and receiving electromagnetic energy, said system comprising in combination means for generating a pulsed signal which is progressively swept in frequency between two frequency values, first signal mixing means, means for applying said pulsed signal to said first mixing means, signal transmitting means connected to the output of said first mixing means, signal receiving means, second signal mixing means connected to the output of said receiving means, means coupled to the output of said second mixing means for progressively delaying the different frequency components of the signal at the output of said second mixing means in accordance with the frequency values of said components, a source of first signals, a source of second signals, means for applying said first and second signals to respective ones of said first and second mixing means, and means for interchanging the application of said first and second signals to said first and second mixing means.

3. A pulse compression radar system comprising means for generating a pulsed signal which is progressively swept in frequency between two frequency values, first signal mixing means, means for applying said pulsed signal to said first mixing means, transmitting means connected to the output of said first mixing means for the irradiation of target objects, means for receiving echo pulses reflected by said target objects, second signal mixing means connected to the output of said means for receiving, means for compressing the pulsed signal at the output of said second mixing means, indicating means connected to the output of said means for compressing, a source of first signals, a source of second signals, and means for applying said first and second signals in alternation to each of said first and second mixing means.

4. A pulse compression radar system comprising means for generating a pulsed signal which is progressively swept in frequency between two frequency values, first signal mixing means, means for applying said pulsed signal to said first mixing means, transmitting means connected to the output of said first mixing means for the irradiation of target objects, means for receiving echo pulses reflected by said target objects, second signal mixing means connected to the output of said means for receiving, means for compressing the pulsed signal at the output of said second mixing means, indicating means connected to the output of said means for compressing, a source of first signals, a source of second signals, means for applying said first and second signals to respective ones of said first and second mixing means, and means for interchanging the application of said first and second signals to said first and second mixing means.

5. A radar system comprising a source of pulsed signal which is progressively swept in frequency between two frequency values, first signal mixing means, means for applying said pulsed signal to said first mixing means, second signal mixing means, connected to the output of said first mixing means, transmitting means connected to the output of said second mixing means for the irradiation of target objects, target echo signal receiving means, third signal mixing means connected to the output of said receiving means, a first local oscillator connected to both said second and third mixing means, fourth signal mixing means connected to the output of said third mixing means, filter means coupled to the output of said fourth mixing means for progressively delaying the different frequency components of the signal at the output of said fourth mixing means in accordance with the frequency values of said components, signal indicating means coupled to the output of said fourth mixing means, a second local oscillator, a third local oscillator, and means for coupling said second and third local oscillators in alternation to each of said first and fourth mixing means.

6. A pulse compression radar system comprising means for generating pulsed signals at a predetermined pulse repetition rate, said pulsed signals being swept in frequency between two frequency values, first signal mixing means, means for applying said pulsed signals to said first mixing means, transmitting means connected to the output of said first mixing means for the irradiation of target objects, means for receiving echo pulses reflected by said target objects, second signal mixing means connected to the output of said means for receiving, means for compressing the pulsed signals at the output of said second mixing means, indicating means connected to the output of said means for compressing, a source of first signals, a source of second signals, means for applying said first and second signals in alternation to each of said first and second mixing means, and means for actuating said last-named means at said pulse repetition rate.

7. Apparatus as defined in claim 6 wherein said means for applying said first and second signals in alternation comprises means for applying said first and second signals to respective ones of said first and second mixing means, and actuable means for reversing the application of said first and second signals to said first and second mixing means.

References Cited

UNITED STATES PATENTS

| | | | |
|---|---|---|---|
| 2,624,876 | 1/1953 | Dicke | 343—17.2 |
| 2,823,375 | 2/1958 | Camp | 343—13 |

RODNEY D. BENNETT, *Primary Examiner.*

C. L. WHITHAM, *Assistant Examiner.*